US010157586B2

(12) United States Patent
Koh et al.

(10) Patent No.: US 10,157,586 B2
(45) Date of Patent: Dec. 18, 2018

(54) DISPLAY PANEL DRIVING APPARATUS, METHOD OF DRIVING A DISPLAY PANEL USING THE SAME, AND DISPLAY APPARATUS HAVING THE SAME

(71) Applicant: SAMSUNG DISPLAY CO., LTD., Yongin-si, Gyeonggi-Do (KR)

(72) Inventors: Jai-Hyun Koh, Yongin-si (KR); Jaehoon Lee, Seoul (KR); Dong-Won Park, Hwaseong-si (KR); Mun-San Park, Hwaseong-si (KR); Bonghyun You, Seongnam-si (KR); Seokha Hong, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/401,369

(22) Filed: Jan. 9, 2017

(65) Prior Publication Data

US 2017/0221443 A1 Aug. 3, 2017

(30) Foreign Application Priority Data

Feb. 2, 2016 (KR) ........................ 10-2016-0012864

(51) Int. Cl.
*G06F 3/038* (2013.01)
*G09G 3/36* (2006.01)

(52) U.S. Cl.
CPC ......... *G09G 3/3688* (2013.01); *G09G 3/3696* (2013.01); *G09G 2300/0413* (2013.01); *G09G 2310/08* (2013.01)

(58) Field of Classification Search
USPC ..... 345/87, 93, 100, 212, 204, 214; 348/731
See application file for complete search history.

(56) References Cited

U.S. PATENT DOCUMENTS

| | | | | |
|---|---|---|---|---|
| 2007/0085798 A1* | 4/2007 | Hashimoto | G09G 3/3648 | 345/93 |
| 2008/0012841 A1* | 1/2008 | Morii | G09G 3/3659 | 345/204 |
| 2008/0143659 A1* | 6/2008 | Ma | G09G 3/3677 | 345/87 |
| 2012/0086627 A1* | 4/2012 | Chen | G09G 3/3677 | 345/100 |

(Continued)

FOREIGN PATENT DOCUMENTS

KR 1020150010844 1/2015

*Primary Examiner* — Thuy Pardo
(74) *Attorney, Agent, or Firm* — F. Chau & Associates, LLC

(57) ABSTRACT

A display panel driving apparatus includes a data driving part, a comparing part, a data signal controlling part, and a gate driving part. The data driving part generates a dummy data signal in response to dummy image data, outputs the dummy data signal to a dummy data line of a display panel, generates a data signal in response to image data, and outputs the data signal to a data line of the display panel. The comparing part outputs a comparison signal in response to the dummy data signal and a delayed dummy data signal generated due to a load of the dummy data line. The comparison signal indicates how much the delayed dummy data signal is delayed with respect to the dummy data signal. The data signal controlling part controls the data signal using the comparison signal.

19 Claims, 11 Drawing Sheets

(56) References Cited

U.S. PATENT DOCUMENTS

| | | | | |
|---|---|---|---|---|
| 2013/0106677 | A1* | 5/2013 | Koo | G11C 19/28 345/87 |
| 2013/0187843 | A1* | 7/2013 | Iwamoto | G09G 3/3611 345/100 |
| 2013/0235025 | A1* | 9/2013 | Kitayama | G09G 3/3614 345/214 |
| 2013/0278572 | A1* | 10/2013 | Lee | G09G 3/3677 345/204 |
| 2013/0278835 | A1* | 10/2013 | Kitayama | G09G 3/3614 348/731 |

* cited by examiner

DISPLAY PANEL DRIVING APPARATUS, METHOD OF DRIVING A DISPLAY PANEL USING THE SAME, AND DISPLAY APPARATUS HAVING THE SAME

CROSS REFERENCE TO RELATED APPLICATION

This application claims priority under 35 U.S.C. § 119 to Korean Patent Application No. 10-2016-0012864, filed on Feb. 2, 2016 in the Korean Intellectual Property Office (KIPO), the disclosure of which is incorporated by reference herein in its entirety.

TECHNICAL FIELD

Exemplary embodiments of the inventive concept relate to an image display, and more particularly, to a display panel driving apparatus, a method of driving a display panel using the display panel driving apparatus, and a display apparatus having the display panel driving apparatus.

DISCUSSION OF RELATED ART

A display apparatus generally includes a display panel and a display panel driving apparatus. The display panel includes gate lines, data lines, and pixels. The display panel driving apparatus includes a gate driving part and a data driving part. The gate driving part outputs gate signals to the gate lines. The data driving part outputs data signals to the data lines. A load of a data line increases as the distance of the data line from the data driving part increases.

SUMMARY

According to an exemplary embodiment of the inventive concept, a display panel driving apparatus includes a data driving part, a comparing part, a data signal controlling part, and a gate driving part. The data driving part is configured to generate a dummy data signal in response to dummy image data, output the dummy data signal to a dummy data line of a display panel, generate a data signal in response to image data, and output the data signal to a data line of the display panel. The comparing part is configured to output a comparison signal in response to the dummy data signal and a delayed dummy data signal generated due to a load of the dummy data line. The comparison signal indicates how much the delayed dummy data signal is delayed with respect to the dummy data signal. The data signal controlling part is configured to control the data signal using the comparison signal. The gate driving part is configured to output a gate signal to a gate line of the display panel.

The comparing part may include a diode configured to receive the dummy data signal and output a diode clipping signal.

The comparing part may further include a comparator configured to compare the diode clipping signal with the delayed dummy data signal and output the comparison signal.

The diode clipping signal may be the dummy data signal decreased by a threshold voltage of the diode.

The comparison signal may be a pulse signal having a high level in a period when the diode clipping signal is higher than the delayed dummy data signal.

The gate line may be one of first to N-th gate lines where N is a natural number. The first gate line is the closest gate line to the data driving part and the N-th gate line is the furthest gate line from the data driving part. The dummy data line may extend across the first to N-th gate lines. The delayed dummy data signal may be delayed due to a resistive-capacitive (RC) delay of the dummy data line.

The data signal controlling part may include a data signal time controlling part configured to control a latch timing of the data signal using the comparison signal.

The data signal time controlling part may include a duty clock counter part configured to count a duty clock of the comparison signal and output a duty clock count signal indicating a duty ratio of the comparison signal, a look-up table configured to store latch timing data of the data signal according to the duty ratio, and a latch timing controlling part configured to read the latch timing data from the look-up table in response to the duty clock count signal and output a latch timing control signal for controlling the latch timing of the data signal.

The gate line may be one of first to N-th gate lines where N is a natural number. The first gate line is the closest gate line to the data driving part and the N-th gate line is the furthest gate line from the data driving part. The data signal time controlling part may control the latch timing of the data signal charged in a first pixel when the N-th gate signal applied to the N-th gate line is activated. The data signal time controlling part may also control latch timings of data signals charged in pixels when the first to (N−1)-th gate signals applied to the first to (N−1)-th gate lines are activated, in accordance with the latch timing of the data signal charged in the first pixel when the N-th gate signal is activated.

An activation time of the data signal may linearly increase as a length of the data line increases.

A level of the data signal may rise increasingly earlier compared to risings of levels of the first to N-th gate signals as the length of the data line increases.

The data signal controlling part may compensate a data voltage of the data signal using the comparison signal.

The data signal controlling part may include a duty clock counter part configured to count a duty clock of the comparison signal and output a duty clock count signal indicating a duty ratio of the comparison signal, a look-up table configured to store compensation data of the data signal according to the duty ratio, and a data voltage compensating part configured to read the compensation data from the look-up table in response to the duty clock count signal, compensate the data voltage of the data signal using the compensation data, and output the data signal.

The gate line may be one of first to N-th gate lines where N is a natural number. The data signal controlling part may compensate the data voltage of the data signal corresponding to the N-th gate line, and may compensate data voltages of the data signal corresponding to the first to (N−1)-th gate lines according to the data signal corresponding to the N-th gate line.

The data voltage of the data signal may linearly increase as a length of the data line increases.

According to an exemplary embodiment of the inventive concept, a method of driving a display panel includes inputting a dummy data signal, generated in response to dummy image data, to a diode to output a diode clipping signal, applying the dummy data signal to a dummy data line in a display panel to output a delayed dummy data signal, comparing the diode clipping signal with the delayed dummy data signal to output a comparison signal, counting a duty clock of the comparison signal to output a duty clock count signal, controlling a data signal according to the duty clock count signal, outputting the data signal to a data line of the display panel, and outputting a gate signal to a gate line of the display panel.

Controlling the data signal according to the duty clock count signal may include reading latch timing data from a look-up table using the duty clock count signal, outputting a latch timing control signal for controlling a latch timing of the data signal using the latch timing data, and controlling the latch timing of the data signal using the latch timing control signal.

Controlling the data signal according to the duty clock count signal may include reading compensation data of the data signal from a look-up table using the duty clock count signal, and compensating a data voltage of the data signal using the compensation data.

According to an exemplary embodiment of the inventive concept, a display apparatus includes a display panel and a display panel driving apparatus. The display panel is configured to display an image, and includes a gate line, a data line, and a dummy data line. The display panel driving apparatus includes a data driving part, a comparing part, a data signal controlling part, and a gate driving part. The data driving part is configured to generate a dummy data signal in response to dummy image data, output the dummy data signal to the dummy data line of the display panel, generate a data signal in response to image data, and output the data signal to the data line of the display panel. The comparing part is configured to output a comparison signal in response to the dummy data signal and a delayed dummy data signal generated due to a load of the dummy data line. The comparison signal indicates how much the delayed dummy data signal is delayed with respect to the dummy data signal. The data signal controlling part is configured to control the data signal using the comparison signal. The gate driving part is configured to output a gate signal to the gate line of the display panel.

The comparing part may include a diode configured to receive the dummy data signal and output a diode clipping signal, and a comparator configured to compare the diode clipping signal with the delayed dummy data signal and output the comparison signal.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF THE EMBODIMENTS

Figure 1:
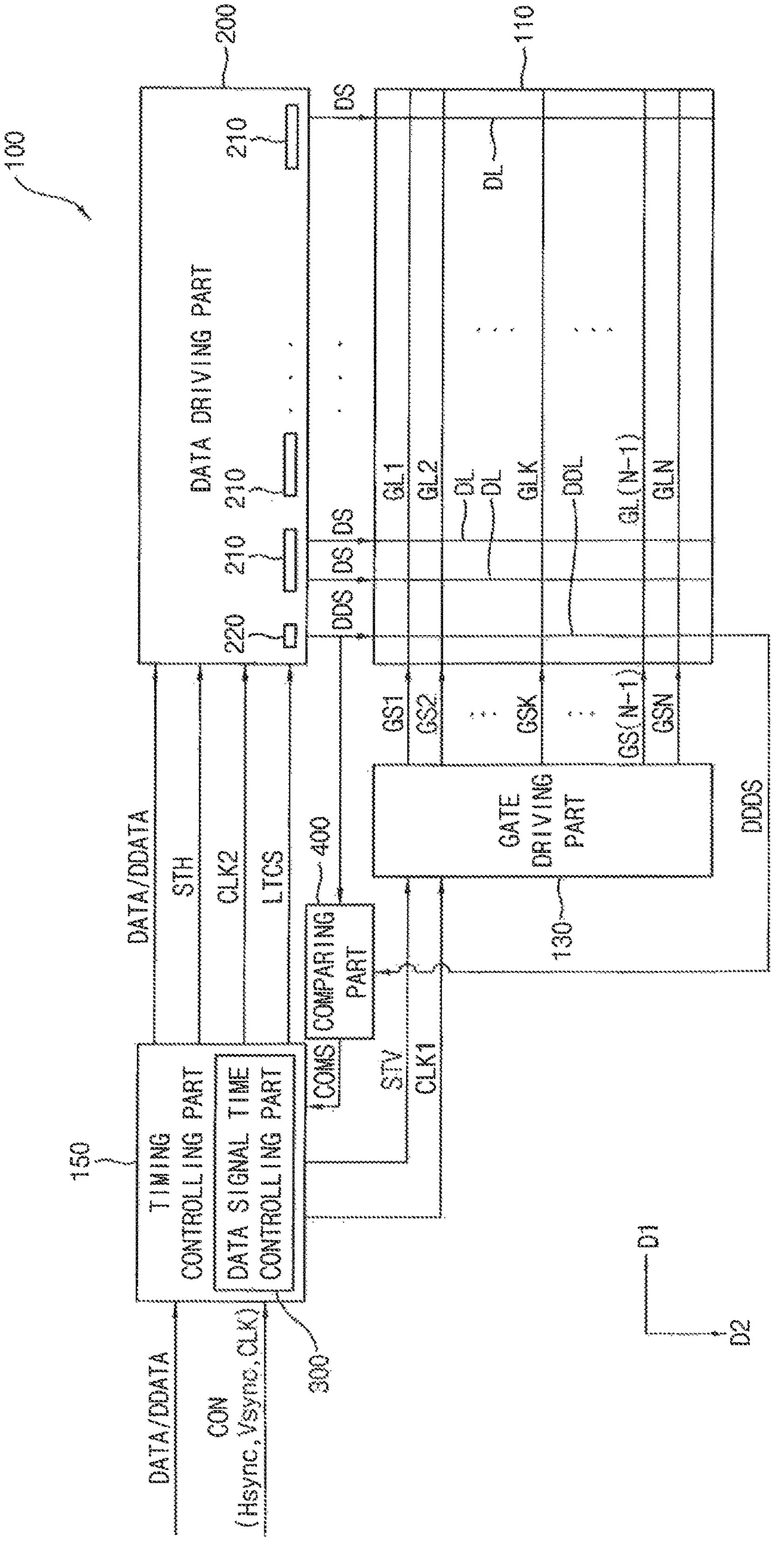
FIG. 1 is a block diagram illustrating a display apparatus according to an exemplary embodiment of the inventive concept.

Exemplary embodiments of the inventive concept will be described more fully hereinafter with reference to the accompanying drawings. Like reference numerals refer to like elements throughout the accompanying drawings.

Exemplary embodiments of the inventive concept provide a display panel driving apparatus capable of increasing display quality of a display apparatus.

Exemplary embodiments of the inventive concept also provide a method of driving a display panel using the above-mentioned display panel driving apparatus.

Exemplary embodiments of the inventive concept also provide a display apparatus having the above-mentioned display panel driving apparatus.

FIG. 1 is a block diagram illustrating a display apparatus according to an exemplary embodiment of the inventive concept.

Referring to FIG. 1, the display apparatus 100 according to the present exemplary embodiment includes a display panel 110, a gate driving part 130, a data driving part 200, a timing controlling part 150, and a comparing part 400.

The display panel 110 receives a data signal DS based on image data DATA provided from the timing controlling part 150 to display an image. The display panel 110 includes gate lines GL1, GL2, . . . , GLK, . . . , GL(N−1), and GLN, data lines DL, and a plurality of pixels. 'N' is a natural number, and 'K' may be 'N/2'. The gate lines GL extend in a first direction D1 and are arranged in a second direction D2 that is substantially perpendicular to the first direction D1. The data lines DL extend in the second direction D2 and are arranged in the first direction D1. The pixels are defined, at least in part, by the gate lines GL1 to GLN and the data lines DL. For example, each of the pixels may include a thin film transistor electrically connected to one of the gate lines GL1 to GLN and one of the data lines DL, a liquid crystal capacitor, and a storage capacitor connected to the thin film transistor. As such, the display panel 110 may be a liquid crystal display panel.

In addition, the display panel 110 includes a dummy data line DDL. The dummy data line DDL extends in the second direction D2. The dummy data line DDL may extend substantially in parallel with the data lines DL and be located closer to the gate driving part 300 than the data lines DL with respect to the first direction D1.

The gate driving part 130, the data driving part 200, the timing controlling part 150, and the comparing part 400 may be referred to as a display panel driving apparatus for driving the display panel 110.

The gate driving part 130 generates gate signals GS1, GS2, . . . , GSK, . . . , GS(N−1), and GSN in response to a vertical start signal STV and a first clock signal CLK1 provided from the timing controlling part 150, and outputs the gate signals GS1 to GSN to the gate lines GL1 to GLN.

The data driving part 200 includes a plurality of data driving integrated circuits 210 and a dummy data driving integrated circuit 220.

Each of the data driving integrated circuits 210 included in the data driving part 200 receives the image data DATA from the timing controlling part 150, generates the data signal DS based on the image data DATA, and outputs the data signal DS to the data lines DL in response to a horizontal start signal STH and a second clock signal CLK2 provided from the timing controlling part 150.

The dummy data driving integrated circuit 220 receives dummy image data DDATA from the timing controlling part 150, generates a dummy data signal DDS based on the dummy image data DDATA, and applies the dummy data signal DDS to the dummy data line DDL and the comparing part 400.

The timing controlling part 150 receives the image data DATA, the dummy image data DDATA, and a control signal CON from an outside source (e.g., a host). The control signal CON may include a horizontal synchronous signal Hsync, a vertical synchronous signal Vsync, and a clock signal CLK. The timing controlling part 150 generates the horizontal start signal STH using the horizontal synchronous signal Hsync and outputs the horizontal start signal STH to the data driving part 200. In addition, the timing controlling part 150 generates the vertical start signal STV using the vertical synchronous signal Vsync and outputs the vertical start signal STV to the gate driving part 130. Furthermore, the timing controlling part 150 generates the first clock signal CLK1 and the second clock signal CLK2 using the clock signal CLK, outputs the first clock signal CLK1 to the gate driving part 130, and outputs the second clock signal CLK2 to the data driving part 200.

The timing controlling part 150 may include a data signal time controlling part 300. The data signal time controlling part 300 outputs a latch timing control signal LTCS for controlling an activation time and a latch timing, based on a comparison signal COMS output from the comparing part 400.

The comparing part 400 compares the dummy data signal DDS with a delayed dummy data signal DDDS, and outputs the comparison signal COMS to the data signal time controlling part 300 of the timing controlling part 150. The delayed dummy data signal DDDS is generated due to a load of the dummy data line DDL. For example, the delayed dummy data signal DDDS may be generated due to a resistive-capacitive (RC) delay of the dummy data line DDL. The dummy data line DDL may extend in the second direction D2 from a start point of the display panel 110 nearest to the data driving part 200 to a point where the dummy data line DDL overlaps the N-th gate line GSN (e.g., the last gate line). Thus, the delayed dummy data signal DDDS may be delayed compared to the dummy data signal DDS due to the RC delay of the dummy data line DDL. The comparison signal COMS indicates a delay level of the delayed dummy data signal DDDS compared to the dummy data signal DDS.

Figure 2:
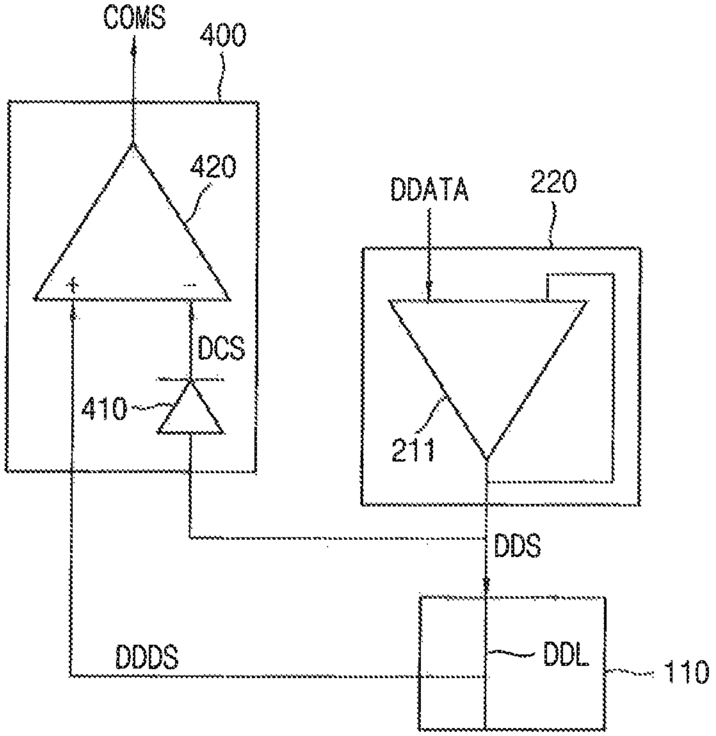
FIG. 2 is a block diagram illustrating a display panel, a dummy data driving integrated circuit, and a comparing part according to an exemplary embodiment of the inventive concept.

FIG. 2 is a block diagram illustrating the display panel 110, the dummy data driving integrated circuit 220, and the comparing part 400 according to an exemplary embodiment of the inventive concept.

Referring to FIGS. 1 and 2, as described above, the display panel 110 includes the dummy data line DDL. The load of the dummy data line DDL increases as the length of the dummy data line DDL increases.

The dummy data driving integrated circuit 220 included in the data driving circuit 200 includes a dummy amplifier 211. The dummy amplifier 211 may be a dummy buffer. The dummy data driving integrated circuit 220 receives the dummy image data DDATA, generates the dummy data signal DDS based on the dummy image data DDATA, and applies the dummy data signal DDS to the dummy data line DDL of the display panel 110. Thus, the delayed dummy data signal DDDS, which is the dummy data signal DDS after being transmitted through the dummy data line DDL, is output from the display panel 110. In other words, the delayed dummy data signal DDDS is a signal (e.g., the dummy data signal DDS) influenced by the load of the dummy data line DDL.

The comparing part 400 includes a diode 410 and a comparator 420.

The diode 410 receives the dummy data signal DDS and outputs a diode clipping signal DCS. The diode clipping signal DCS may be the dummy data signal DDS decreased by a threshold voltage of the diode 410. For example, the threshold voltage of the diode 410 may be about 0.7 V. In this case, each of the dummy data signal DDS and the diode clipping signal DCS is a signal which is not influenced by the load of the dummy data line DDL.

The comparator 420 compares the delayed dummy data signal DDDS with the diode clipping signal DCS and outputs the comparison signal COMS. In other words, the comparator 420 receives the delayed dummy data signal DDDS through a positive terminal, receives the diode clipping signal DCS through a negative terminal, and outputs the comparison signal COMS through an output terminal.

Figure 3:
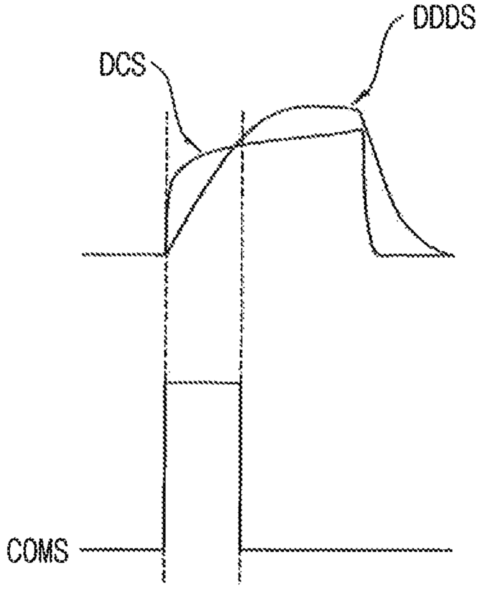
FIG. 3 is a waveform diagram illustrating a diode clipping signal, a delayed dummy data signal, and a comparison signal of FIG. 2 according to an exemplary embodiment of the inventive concept.

FIG. 3 is a waveform diagram illustrating the diode clipping signal DCS, the delayed dummy data signal DDDS, and the comparison signal COMS of FIG. 2 according to an exemplary embodiment of the inventive concept.

Referring to FIG. 3, the comparison signal COMS may be a pulse signal. The comparison signal COMS has a high level in a period when the diode clipping signal DCS is higher than the delayed dummy data signal DDDS. For example, the duty ratio of the comparison signal COMS may be about 20%.

Figure 4:
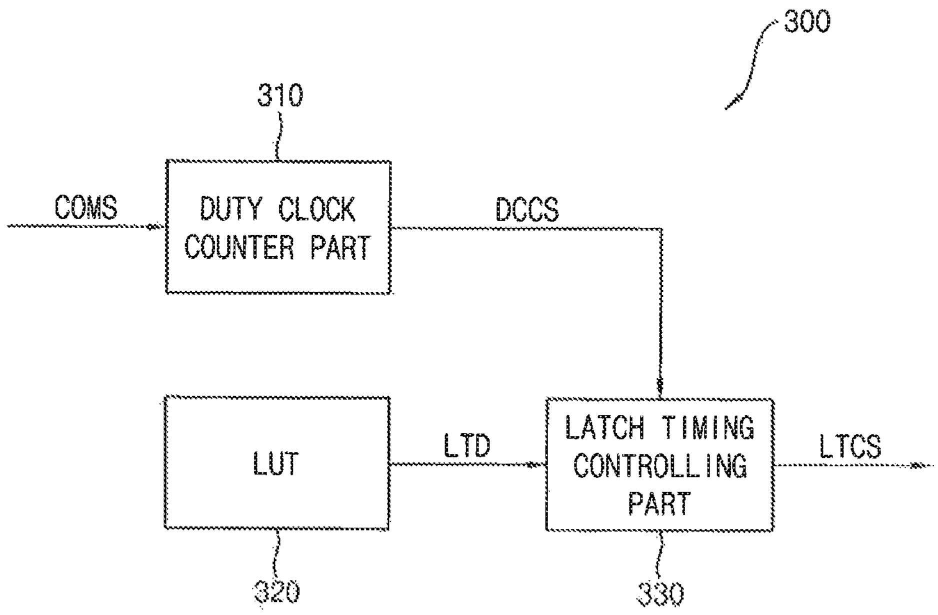
FIG. 4 is a block diagram illustrating a data signal time controlling part of FIG. 1 according to an exemplary embodiment of the inventive concept.

FIG. 4 is a block diagram illustrating the data signal time controlling part 300 of FIG. 1 according to an exemplary embodiment of the inventive concept.

Referring to FIGS. 1 to 4, the data signal time controlling part 300 includes a duty clock counter part 310, a look-up table 320, and a latch timing controlling part 330.

The duty clock counter part 310 receives the comparison signal COMS from the comparing part 400. The duty clock counter part 310 counts a duty clock of the comparison signal COMS to output a duty clock count signal DCCS, indicating the duty ratio of the comparison signal COMS, to the latch timing controlling part 330.

The look-up table 320 stores and outputs latch timing data LTD of the data signal DS according to the duty ratio.

The latch timing controlling part 330 reads the latch timing data LTD of the data signal DS from the look-up table 320 based on the duty clock count signal DCCS, and outputs the latch timing control signal LTCS for controlling the latch timing of the data signal DS. In other words, the comparison signal COMS is generated by comparing the dummy data signal DDS, which is not affected by the load of the dummy data line DDL, with the delayed dummy data signal DDDS, which corresponds to the N-th gate signal GSN applied to the N-th gate line GLN. The latch timing control signal LTCS is generated using the comparison signal COMS and controls a latch timing of the data signal DS charged in the pixel when the N-th gate signal GSN applied to the N-th gate line GLN is activated.

Since the load and RC delay of the data line DL increase as the length of the data line DL increases, an activation time of the data signal DS may gradually increase as well. The activation time of the data signal DS may linearly increase with the increase of the length of the data line DL. In addition, as the length of the data line DL increases, a start time point of the data signal DS may be increasingly earlier compared with rising time points of each of the gate signals GS1 to GSN for charging the data signal DS to the pixel. In other words, the start time point of the data signal DS may be substantially the same as the rising time point of the first gate signal GS1 whereas the start time point of the data signal DS may be earlier than the rising time point of the N-th gate signal GSN. This will be described in further detail with reference to FIGS. 5A to 5C. The difference between the start time point of the data signal DS and the rising time points of each of the gate signals GS1 to GSN may have a linear relationship with the length of the data line DL.

Thus, after the data signal time controlling part 300 controls the latch timing of the data signal DS charged in the pixel when the N-th gate signal GSN applied to the N-th gate line GLN is activated, the data signal time controlling part 300 may then control latch timings of data signals DS charged in pixels when remaining gate signals GS1 to GS(N−1) applied to remaining gate lines GL1 to GL(N−1) are activated in accordance with the latch timing of the data signal DS charged in the pixel when the N-th gate signal GSN is activated.

Since the data signal time controlling part 300 controls the data signal DS, the data signal time controlling part 300 may be referred to as a data signal controlling part.

Figure 5A:
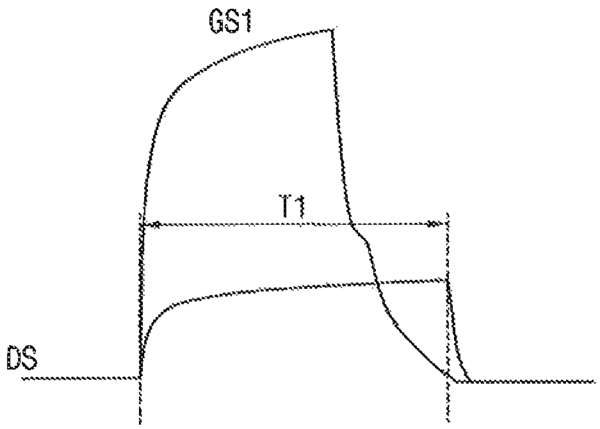
FIG. 5A is a waveform diagram illustrating a first gate signal and a data signal of FIG. 1 according to an exemplary embodiment of the inventive concept.
Figure 5B:
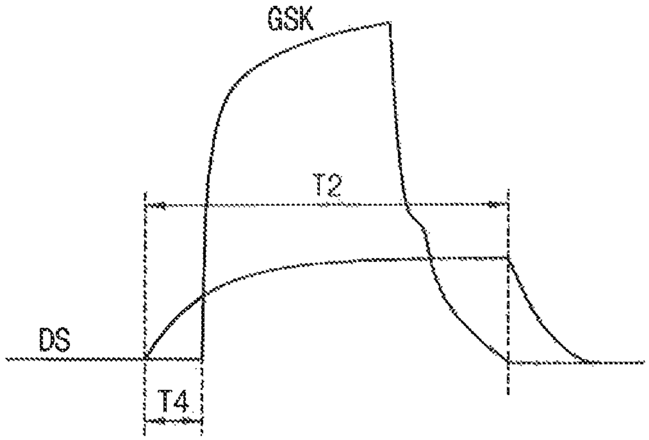
FIG. 5B is a waveform diagram illustrating a K-th gate signal and the data signal of FIG. 1 according to an exemplary embodiment of the inventive concept.
Figure 5C:
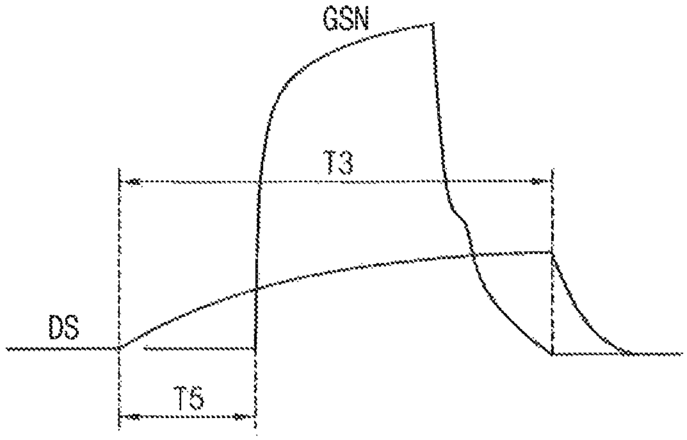
FIG. 5C is a waveform diagram illustrating an N-th gate signal and the data signal of FIG. 1 according to an exemplary embodiment of the inventive concept.

FIG. 5A is a waveform diagram illustrating the first gate signal GS1 and the data signal DS of FIG. 1 according to an exemplary embodiment of the inventive concept. FIG. 5B is a waveform diagram illustrating the K-th gate signal GSK and the data signal DS of FIG. 1 according to an exemplary embodiment of the inventive concept. FIG. 5C is a waveform diagram illustrating the N-th gate signal GSN and the data signal DS of FIG. 1 according to an exemplary embodiment of the inventive concept.

Referring to FIGS. 1 and 5A to 5C, when the first gate signal GS1 is applied to the first gate line GL1 and thus the first gate signal GS1 is activated, an activation time of the data signal DS charged in the pixel may be a first time T1. For example, the first time T1 may be about 0.8 horizontal time.

When the K-th gate signal GSK is applied to the K-th gate line GLK and thus the K-th gate signal GSK is activated, the activation time of the data signal DS charged in the pixel may be a second time T2. Here, the second time T2 is longer than the first time T1. For example, the second time T2 may be about 1 horizontal time (e.g., 25% longer than the first time T1).

When the N-th gate signal GSN is applied to the N-th gate line GLN and thus the N-th gate signal GSN is activated, the activation time of the data signal DS charged in the pixel may be a third time T3. Here, the third time T3 is longer than the second time T2. For example, the third time T3 may be about 1.2 horizontal time (e.g., 50% longer than the first time T1).

As described above, the start time point of the data signal may be increasingly earlier compared with the rising time points of the gate signals GS1 to GSN as the length of the data line DL increases.

For example, when the first gate signal GS1 is applied to the first gate line GL1 and thus the first gate signal GS1 is activated, a rising time point of the data signal DS may be substantially the same as the rising time point of the first gate signal GS1. When K-th gate signal GSK is applied to the K-th gate line GLK and thus the K-th gate signal GSK is activated, the rising time point of the data signal DS may be earlier than the rising time point of the K-th gate signal GSK by a fourth time T4. When the N-th gate signal GSN is applied to the N-th gate line GLN and thus the N-th gate signal GSN is activated, the rising time point of the data signal DS may be earlier than the rising time point of the N-th gate signal GSK by a fifth time T5 that is longer than the fourth time T4.

Figure 6:
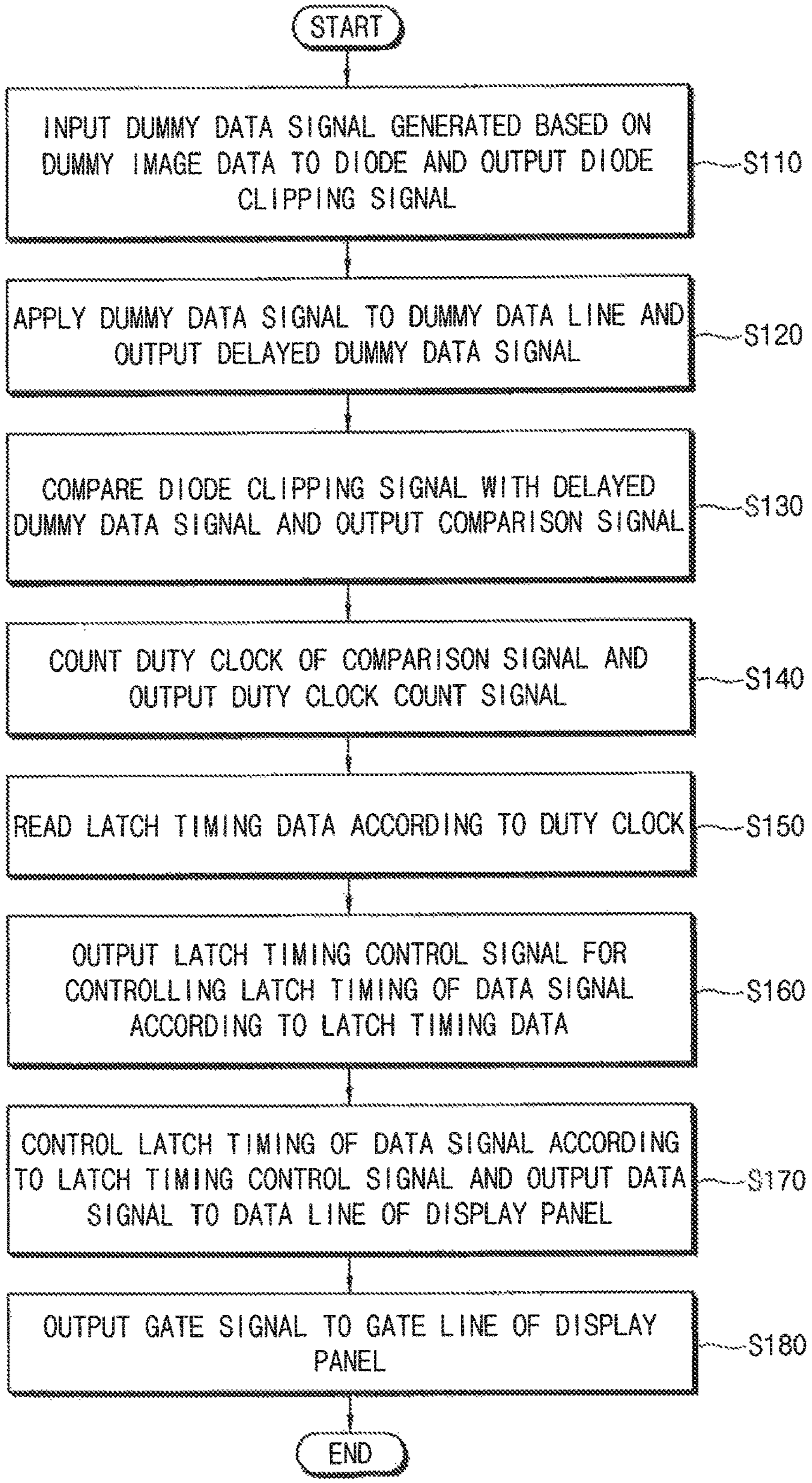
FIG. 6 is flowchart illustrating a method of driving a display panel performed by a display panel driving apparatus of FIG. 1 according to an exemplary embodiment of the inventive concept.

FIG. 6 is flowchart illustrating a method of driving a display panel performed by the display panel driving apparatus of FIG. 1 according to an exemplary embodiment of the inventive concept.

Referring to FIGS. 1 to 6, the dummy data signal DDS, generated based on the dummy image data DDATA, is input to the diode 410, and the diode clipping signal DCS is output from the diode 410 (operation S110). In other words, the dummy data driving integrated circuit 220 receives the dummy image data DDATA, generates the dummy data signal DDS based on the dummy image data DDATA, and applies the dummy data signal DDS to the diode 410. The diode 410 receives the dummy data signal DDS, and outputs the diode clipping signal DCS. The diode clipping signal DCS may be the dummy data signal DDS decreased by the threshold voltage of the diode 410.

The dummy data signal DDS is applied to the dummy data line DDL and the delayed dummy data signal DDDS is output (operation S120). As described above, the dummy data driving integrated circuit 220 applies the dummy data signal DDS to the dummy data line DDL of the display panel 110. Thus, the delayed dummy data signal DDDS, which is generated by passing through the dummy data line DDL, is output from the display panel 110.

The diode clipping signal DCS is compared with the delayed dummy data signal DDDS, and the comparison signal COMS is output (operation S130). As described above, the comparator 420 compares the delayed dummy data signal DDDS with the diode clipping signal DCS, and outputs the comparison signal COMS. For example, the comparator 420 receives the delayed dummy data signal DDDS through the positive terminal, receives the diode clipping signal DCS through the negative terminal, and outputs the comparison signal COMS through the output terminal. The comparison signal COMS may be a pulse signal. The comparison signal COMS has a high level in a period when the diode clipping signal DCS is higher than the delayed dummy data signal DDDS.

The duty clock of the comparison signal COMS is counted and the duty clock count signal DCCS is output (operation S140). As described above, the duty clock counter part 310 receives the comparison signal COMS from the comparing part 400. The duty clock counter part 310 counts the duty clock of the comparison signal COMS to output the duty clock count signal DCCS, which indicates the duty ratio of the comparison signal COMS, to the latch timing controlling part 330.

The latch timing data LTD according to the duty clock is read (operation S150). As described above, the look-up table 320 stores the latch timing data LTD of the data signal DS according to the duty ratio. The latch timing controlling part 330 reads the latch timing data LTD from the look-up table 320 based on the duty clock count signal DCCS.

The latch timing control signal LTCS, for controlling the latch timing of the data signal DS according to the latch timing data LTD, is output (operation S160). For example, the latch timing controlling part 330 outputs the latch timing control signal LTCS for controlling the latch timing of the data signal DS.

The latch timing of the data signal DS is controlled according to the latch timing control signal LTCS, and the data signal DS is output to the data line DL of the display panel 110 (operation S170). As described above, the latch timing control signal LTCS controls the latch timing of the data signal DS charged in the pixel when the N-th gate signal GSN applied to the N-th gate line GLN is activated. After the data signal time controlling part 300 controls the latch timing of the data signal DS charged in the pixel when the N-th gate signal GSN applied to the N-th gate line GLN is activated, the data signal time controlling part 300 may control the latch timings of the data signal DS charged in the pixel when the remaining gate signals GS1 to GS(N−1) applied to the remaining gate lines GL1 to GL(N−1) are activated.

The activation time of the data signal DS may be gradually increased as the length of the data line DL increases. For example, the activation time of the data signal DS may be linearly increased as the length of the data line DL increases, as described with reference to FIGS. 5A to 5C. When the first gate signal GS1 is applied to the first gate line GL1 and thus the first gate signal GS1 is activated, the activation time of the data signal DS charged in the pixel may be the first time T1. When the K-th gate signal GSK is applied to the K-th gate line GLK and thus the K-th gate signal GSK is activated, the activation time of the data signal DS charged in the pixel may be the second time T2 that is longer than the first time T1. When the N-th gate signal GSN is applied to the N-th gate line GLN and thus the N-th gate signal GSN is activated, the activation time of the data signal DS charged in the pixel may be the third time T3 that is longer than the second time T2.

Each of the data driving integrated circuits 210 included in the data driving part 200 outputs the data signal DS to the data line DL according to the latch timing control signal LTCS, the horizontal start signal STH, and the second clock signal CLK2 provided from the timing controlling part 150.

The gate signals GS1 to GSN are output to the gate lines GL1 to GLN (operation S180). For example, the gate driving part 130 generates the gate signals GS1 to GSN in response to the vertical start signal STV and the first clock signal CLK1 provided from the timing controlling part 150, and outputs the gate signals GS1 to GSN to the gate lines GL1 to GLN.

According to the present exemplary embodiment, the activation time and the latch timing of the data signal DS are controlled according to the load and the RC delay of the data line DL. Therefore, charge rates of the data signal DS charged in the pixels may be increased and equalized. Thus, display quality of the display apparatus 100 may be increased.

Figure 7:
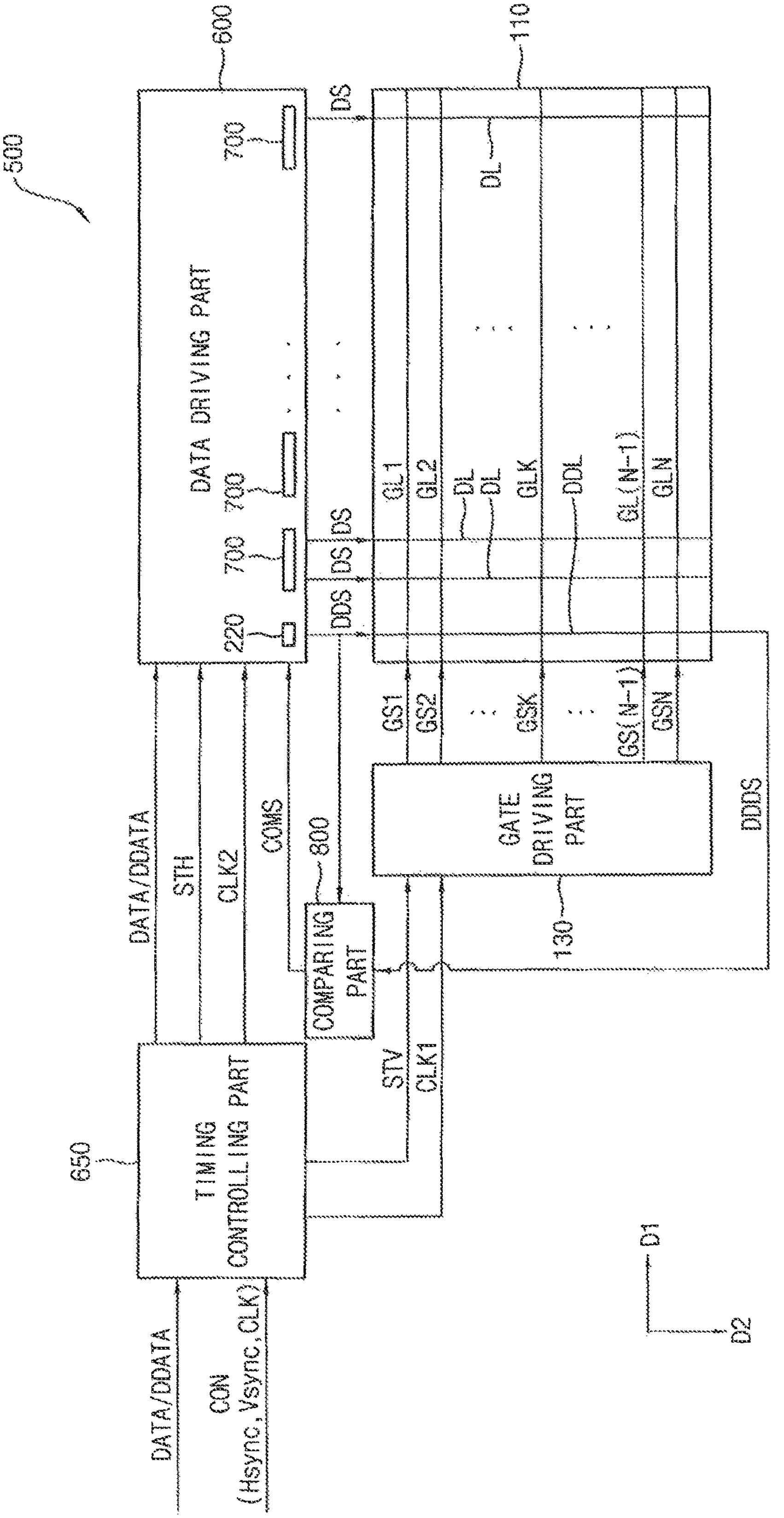
FIG. 7 is a block diagram illustrating a display apparatus according to an exemplary embodiment of the inventive concept

FIG. 7 is a block diagram illustrating a display apparatus according to an exemplary embodiment of the inventive concept.

A display apparatus 500 in FIG. 7, according to the present exemplary embodiment, is substantially the same as the display apparatus 100 of FIG. 1 except for a data driving part 600, a timing controlling part 650, and a comparing part 800. Thus, the same reference numerals will be used to refer to same or like parts as those described with reference to FIG. 1 and any further repetitive explanation concerning these elements will be omitted.

Referring to FIG. 7, the display apparatus 500 includes the display panel 110, the gate driving part 130, the data driving part 600, the timing controlling part 650, and the comparing part 800.

The display panel 110 receives the data signal DS, based on the image data DATA provided from the timing controlling part 650, to display an image.

The gate driving part 130, the data driving part 600, the timing controlling part 650, and the comparing part 800 may be referred to as a display panel driving apparatus for driving the display panel 110.

The gate driving part 130 generates the gate signals GS1 to GSN in response to the vertical start signal STV and the first clock signal CLK1 provided from the timing controlling part 650, and outputs the gate signals GS1 to GSN to the gate lines GL1 to GLN.

The data driving part 600 includes a plurality of data driving integrated circuits 700 and the dummy data driving integrated circuit 220.

Each of the data driving integrated circuits 700 included in the data driving part 600 receives the image data DATA from the timing controlling part 650, generates the data signal DS based on the image data DATA, and outputs the data signal DS to the data lines DL in response to the horizontal start signal STH and the second clock signal CLK2 provided from the timing controlling part 650.

The dummy data driving integrated circuit 220 receives the dummy image data DDATA from the timing controlling part 650, generates the dummy data signal DDS based on the dummy image data DDATA, and applies the dummy data signal DDS to the dummy data line DDL and the comparing part 800.

The timing controlling part 650 receives the image data DATA, the dummy image data DDATA, and the control signal CON from an outside source (e.g., a host). The control signal CON may include the horizontal synchronous signal Hsync, the vertical synchronous signal Vsync, and the clock signal CLK. The timing controlling part 650 generates the horizontal start signal STH using the horizontal synchronous signal Hsync and outputs the horizontal start signal STH to the data driving part 600. In addition, the timing controlling part 650 generates the vertical start signal STV using the vertical synchronous signal Vsync and outputs the vertical start signal STV to the gate driving part 130. Furthermore, the timing controlling part 650 generates the first clock signal CLK1 and the second clock signal CLK2 using the clock signal CLK, outputs the first clock signal CLK1 to the gate driving part 130, and outputs the second clock signal CLK2 to the data driving part 600.

The comparing part 800 compares the dummy data signal DDS with the delayed dummy data signal DDDS, and outputs the comparison signal COMS to the data driving part 600.

The comparing part 800 may be substantially the same as the comparing part 400 of FIG. 2. As such, the comparing part 800 may include the diode 410 and the comparator 420.

Figure 8:
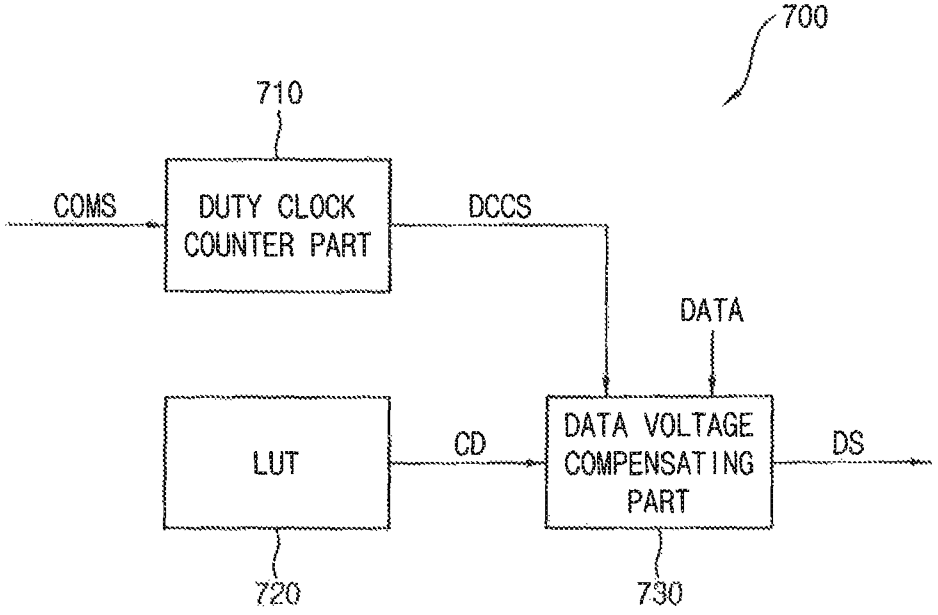
FIG. 8 is a block diagram illustrating a data driving integrated circuit of FIG. 7 according to an exemplary embodiment of the inventive concept.

FIG. 8 is a block diagram illustrating the data driving integrated circuit 700 of FIG. 7 according to an exemplary embodiment of the inventive concept.

Referring to FIGS. 7 and 8, the data driving integrated circuit 700 includes a duty clock counter part 710, a look-up table 720, and a data voltage compensating part 730.

The duty clock counter part 710 receives the comparison signal COMS from the comparing part 800. The duty clock counter part 710 counts the duty clock of the comparison signal COMS, and outputs the duty clock count signal DCCS indicating the duty ratio of the comparison signal COMS to the data voltage compensating part 730.

The look-up table 720 stores and outputs compensating data CD of the data signal DS according to the duty ratio.

The data voltage compensating part 730 reads the compensating data CD from the look-up table 720 based on the duty clock count signal DCCS, compensates a data voltage of the data signal DS according to the compensating data CD, and outputs the data signal DS. In other words, the comparison signal COMS is generated by comparing the dummy data signal DDS, which is not affected by the load of the dummy data line DDL, with the delayed dummy data signal DDDS, which corresponds to the N-th gate signal GSN applied to the N-th gate line GLN. Based on the comparison signal COMS, the data voltage compensating part 730 compensates the data voltage of the data signal charged in the pixel when the N-th gate signal GSN applied to the N-th gate line GLN is activated.

Since the load and the RC delay increase as the length of the data line DL increases, the data voltage of the data signal DS may also gradually increase. For example, the data voltage of the data signal DS may be increased linearly as the length of the data line DL increases.

Thus, after the data voltage compensating part 730 compensates and controls the data voltage of the data signal DS charged in the pixel when the N-th gate signal GSN applied to the N-th gate line GLN is activated, the data voltage compensating part 730 may then compensate and control data voltages of the data signals DS charged in the pixels when the remaining gate signals GS1 to GS(N−1) applied to the remaining gate lines GL1 to GL(N−1) are activated in accordance with the data voltage of the data signal DS charged in the pixel when the N-th gate signal GSN is activated.

Since the duty clock counter part 710, the look-up table 720, and the data voltage compensating part 730 controls the data signal DS, they may be referred to as the data signal controlling part.

Figure 9A:
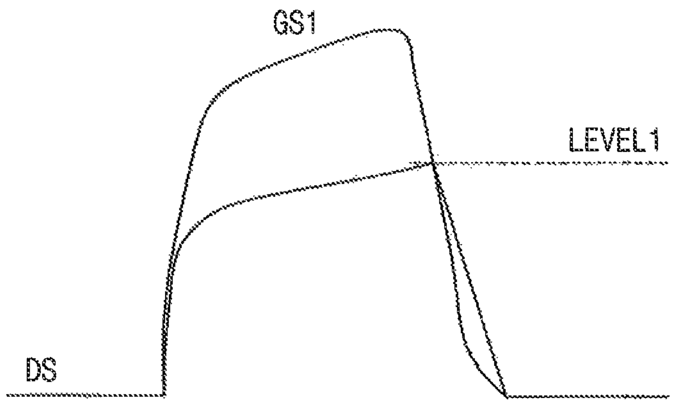
FIG. 9A is a waveform diagram illustrating a first gate signal and a data signal of FIG. 7 according to an exemplary embodiment of the inventive concept.
Figure 9B:
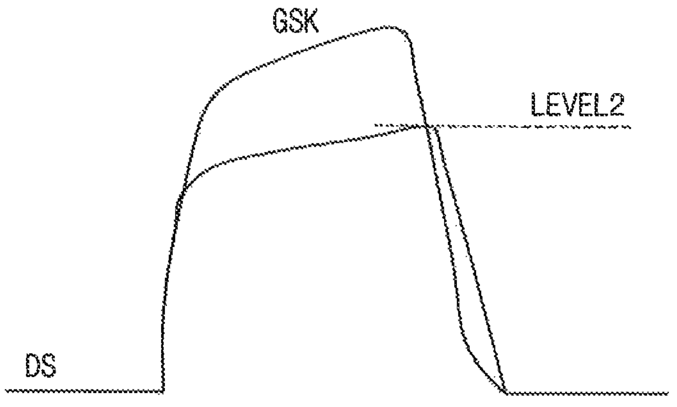
FIG. 9B is a waveform diagram illustrating a K-th gate signal and the data signal of FIG. 7 according to an exemplary embodiment of the inventive concept.
Figure 9C:
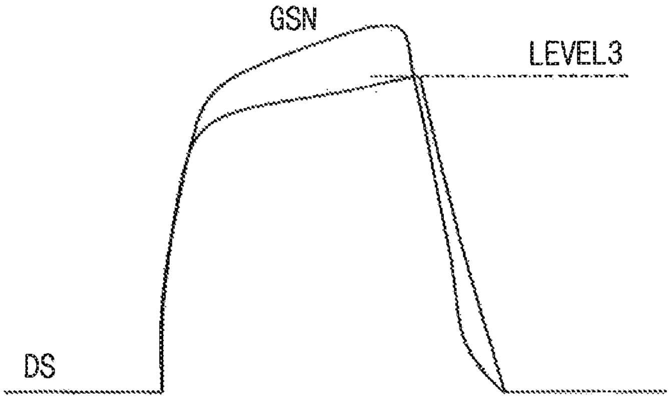
FIG. 9C is a waveform diagram illustrating an N-th gate signal and the data signal of FIG. 7 according to an exemplary embodiment of the inventive concept.

FIG. 9A is a waveform diagram illustrating the first gate signal GS1 and the data signal DS of FIG. 7 according to an exemplary embodiment of the inventive concept. FIG. 9B is a waveform diagram illustrating the K-th gate signal GSK and the data signal DS of FIG. 7 according to an exemplary embodiment of the inventive concept. FIG. 9C is a waveform diagram illustrating the N-th gate signal GSN and the data signal DS of FIG. 7 according to an exemplary embodiment of the inventive concept.

Referring to FIGS. 7 to 9C, when the first gate signal GS1 is applied to the first gate line GL1 and thus the first gate signal GS1 is activated, the data signal DS charged in the pixel may have a first level LEVEL1.

When the K-th gate signal GSK is applied to the K-th gate line GLK and thus the K-th gate signal GSK is activated, the data signal DS charged in the pixel may have a second level LEVEL2. Here, the second level LEVEL2 is greater than the first level LEVEL1.

When the N-th gate signal GSN is applied to the N-th gate line GLN and thus the N-th gate signal GSN is activated, the data signal DS charged in the pixel may have a third level LEVEL3. Here, the third level LEVEL3 is greater than the second level LEVEL2. In other words, the second level LEVEL2 may be a medium level between the first level LEVEL1 and the third level LEVEL3.

Figure 10:
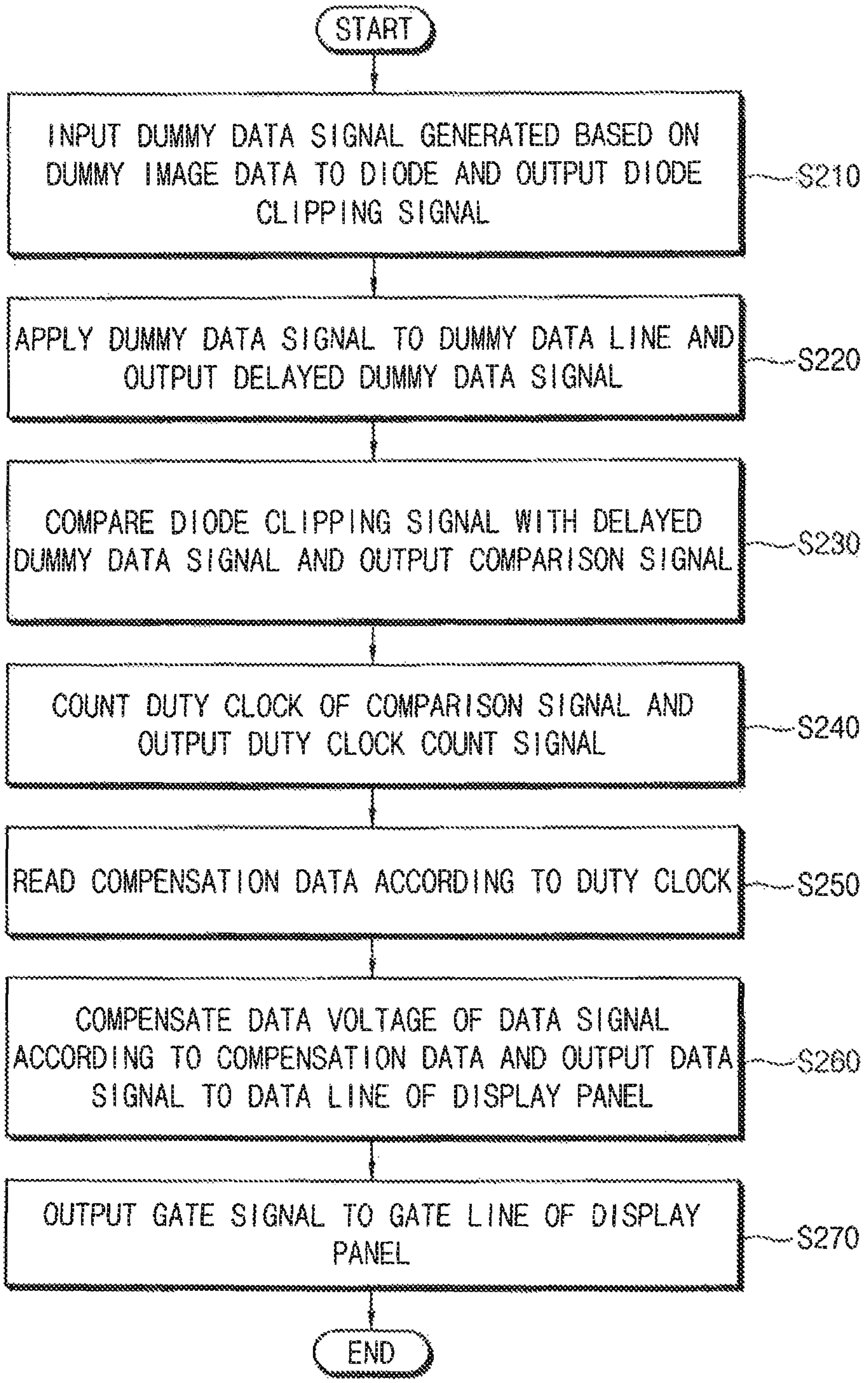
FIG. 10 is flowchart illustrating a method of driving a display panel performed by a display panel driving apparatus of FIG. 7 according to an exemplary embodiment of the inventive concept.

FIG. 10 is flowchart illustrating a method of driving a display panel performed by the display panel driving apparatus of FIG. 7 according to an exemplary embodiment of the inventive concept.

Referring to FIGS. 2, 3, and 7 to 10, the dummy data signal DDS, generated based on the dummy image data DDATA, is input to the diode 410, and the diode clipping signal DCS is output from the diode 410 (operation S210). For example, the dummy data driving integrated circuit 220 receives the dummy image data DDATA, generates the dummy data signal DDS based on the dummy image data DDATA, and applies the dummy data signal DDS to the diode 410. The diode 410 receives the dummy data signal DDS, and outputs the diode clipping signal DCS. The diode clipping signal DCS may be the dummy data signal DDS decreased by the threshold voltage of the diode 410.

The dummy data signal DDS is applied to the dummy data line DDL and the delayed dummy data signal DDDS is output (operation S220). In other words, the dummy data driving integrated circuit 220 applies the dummy data signal DDS to the dummy data line DDL of the display panel 110. Thus, the delayed dummy data signal DDDS, which is generated by passing through the dummy data line DDL, is output from the display panel 110.

The diode clipping signal DCS is compared with the delayed dummy data signal DDDS, and the comparison signal COMS is output (operation S230). For example, the comparator 420 compares the delayed dummy data signal DDDS with the diode clipping signal DCS and outputs the comparison signal COMS. The comparator 420 receives the delayed dummy data signal DDDS through the positive terminal, receives the diode clipping signal DCS through the negative terminal, and outputs the comparison signal COMS through the output terminal. The comparison signal COMS may be a pulse signal. The comparison signal COMS has a high level in a period when the diode clipping signal DCS is higher than the delayed dummy data signal DDDS.

The duty clock of the comparison signal COMS is counted and the duty clock count signal DCCS is output (operation S240). For example, the duty clock counter part 710 receives the comparison signal COMS from the comparing part 800. The duty clock counter part 710 counts the duty clock of the comparison signal COMS to output the duty clock count signal DCCS, which indicates the duty ratio of the comparison signal COMS, to the data voltage compensating part 730.

The compensating data CD according to the duty clock is read (operation S250). In other words, the look-up table 720 stores the compensating data CD of the data signal DS according to the duty ratio. The data voltage compensating part 730 reads the compensating data CD from the look-up table 720 based on the duty clock count signal DCCS.

The data voltage of the data signal DS is compensated according to the compensating data CD, and the data signal DS is output to the data line DL of the display panel 110 (operation S260). In other words, the data voltage compensating part 730 compensates and controls the data voltage of the data signal DS charged in the pixel when the N-th gate signal GSN applied to the N-th gate line GLN is activated. The data voltage compensating part 730 may then compensate and control the data voltages of the data signals DS charged in the pixels when the remaining gate signals GS1 to GS(N−1) applied to the remaining gate lines GL1 to GL(N−1) are activated in accordance with the data voltage of the data signal DS charged in the pixel when the N-th gate signal GSN is activated.

The data voltage of the data signal DS may be increased gradually as the length of the data line DL increases. For example, the data voltage of the data signal DS may be increased linearly as the length of the data line DL increases. In other words, when the first gate signal GS1 is applied to the first gate line GL1 and thus the first gate signal GS1 is activated, the data signal DS charged in the pixel may have the first level LEVEL1. When the K-th gate signal GSK is applied to the K-th gate line GLK and thus the K-th gate signal GSK is activated, the data signal DS charged in the pixel may have the second level LEVEL2 that is greater than the first level LEVEL1. When the N-th gate signal GSN is applied to the N-th gate line GLN and thus the N-th gate signal GSN is activated, the data signal DS charged in the pixel may have the third level LEVEL3 that is greater than the second level LEVEL2.

The data driving part 600 outputs the data signal DS to the data line DL in response to the horizontal start signal STH and the second clock signal CLK2 provided from the timing controlling part 650.

The gate signals GS1 to GSN are output to the gate lines GL1 to GLN (operation S270). In other words, the gate driving part 130 generates the gate signals GS1 to GSN in response to the vertical start signal STV and the first clock signal CLK1 provided from the timing controlling part 650, and outputs the gate signals GS1 to GSN to the gate lines GL1 to GLN.

According to the present exemplary embodiment, the data voltage of the data signal DS is compensated and controlled according to the load and the RC delay of the data line DL. Therefore, charge rates of the data signal DS charged in the pixels may be increased and equalized. Thus, display quality of the display apparatus 500 may be increased.

The inventive concept may be applied to any electronic device having a display apparatus. For example, the inventive concept may be applied to a television, a computer monitor, a laptop, a digital camera, a cellular phone, a smart phone, a tablet Personal Computer (PC), a smart pad, a Personal Digital Assistant (PDA), a Portable Multimedia Player (PMP), an MP3 player, a navigation system, a camcorder, a portable game console, etc.

As described above, according to the exemplary embodiments of the inventive concept, the data voltage of the data signal may be compensated and controlled according to the load and RC delay of the data line. Therefore, charge rates of the data signals charged in pixels may be increased and equalized. Thus, display quality of a display apparatus may be increased.

While the inventive concept has been shown and described with reference to the exemplary embodiments thereof, it will be understood by those of ordinary skill in the art that various changes in form and details may be made thereto without departing from the spirit and scope of the present inventive concept as defined by the following claims.

What is claimed is:

1. A display panel driving apparatus comprising:

a data driving part configured to generate a dummy data signal in response to dummy image data, output the dummy data signal to a dummy data line of a display panel, generate a data signal in response to image data, and output the data signal to a data line of the display panel;

a comparing part configured to output a comparison signal in response to the dummy data signal and a delayed dummy data signal generated due to a load of the dummy data line, wherein the comparison signal indicates how much the delayed dummy data signal is delayed with respect to the dummy data signal;

a data signal controlling part configured to control the data signal using the comparison signal; and a gate driving part configured to output a gate signal to a gate line of the display panel.

2. The display panel driving apparatus of claim 1, wherein the comparing part comprises a diode configured to receive the dummy data signal and output a diode clipping signal.

3. The display panel driving apparatus of claim 2, wherein the comparing part further comprises a comparator configured to compare the diode clipping signal with the delayed dummy data signal and output the comparison signal.

4. The display panel driving apparatus of claim 3, wherein the diode clipping signal is the dummy data signal decreased by a threshold voltage of the diode.

5. The display panel driving apparatus of claim 4, wherein the comparison signal is a pulse signal having a high level in a period when the diode clipping signal is higher than the delayed dummy data signal.

6. The display panel driving apparatus of claim 1, wherein the gate line is one of first to N-th gate lines and N is a natural number, the first gate line is the closest gate line to the data driving part and the N-th gate line is the furthest gate line from the data driving part, the dummy data line extends across the first to N-th gate lines, and the delayed dummy data signal is delayed due to a resistive-capacitive (RC) delay of the dummy data line.

7. The display panel driving apparatus of claim 1, wherein the data signal controlling part comprises a data signal time controlling part configured to control a latch timing of the data signal using the comparison signal.

8. The display panel driving apparatus of claim 7, wherein the data signal time controlling part comprises:

a duty clock counter part configured to count a duty clock of the comparison signal and output a duty clock count signal indicating a duty ratio of the comparison signal;

a look-up table configured to store latch timing data of the data signal according to the duty ratio; and a latch timing controlling part configured to read the latch timing data from the look-up table in response to the duty clock count signal and output a latch timing control signal for controlling the latch timing of the data signal.

9. The display panel driving apparatus of claim 8, wherein the gate line is one of first to N-th gate lines, the gate signal is one of first to N-th gate signals, and N is a natural number, the first gate line is the closest gate line to the data driving part and the N-th gate line is the furthest gate line from the data driving part, the data signal time controlling part controls the latch timing of the data signal charged in a first pixel when the N-th gate signal applied to the N-th gate line is activated, and the data signal time controlling part controls latch timings of data signals charged in pixels when the first to (N−1)-th gate signals applied to the first to (N−1)-th gate lines are activated, in accordance with the latch timing of the data signal charged in the first pixel when the N-th gate signal is activated.

10. The display panel driving apparatus of claim 9, wherein an activation time of the data signal linearly increases as a length of the data line increases.

11. The display panel driving apparatus of claim 10, wherein a level of the data signal rises increasingly earlier compared to risings of levels of the first to N-th gate signals as the length of the data line increases.

12. The display panel driving apparatus of claim 1, wherein the data signal controlling part compensates a data voltage of the data signal using the comparison signal.

13. The display panel driving apparatus of claim 12, wherein the data signal controlling part comprises:

a duty clock counter part configured to count a duty clock of the comparison signal and output a duty clock count signal indicating a duty ratio of the comparison signal;

a look-up table configured to store compensation data of the data signal according to the duty ratio; and a data voltage compensating part configured to read the compensation data from the look-up table in response to the duty clock count signal, compensate the data voltage of the data signal using the compensation data, and output the data signal.

14. The display panel driving apparatus of claim 13, wherein the gate line is one of first to N-th gate lines and N is a natural number, and the data signal controlling part compensates the data voltage of the data signal corresponding to the N-th gate line, and compensates data voltages of the data signal corresponding to the first to (N−1)-th gate lines according to the data signal corresponding to the N-th gate line.

15. The display panel driving apparatus of claim 14, wherein the data voltage of the data signal linearly increases as a length of the data line increases.

16. A method of driving a display panel, the method comprising:

inputting a dummy data signal, generated in response to dummy image data, to a diode to output a diode clipping signal;

applying the dummy data signal to a dummy data line in a display panel to output a delayed dummy data signal;

comparing the diode clipping signal with the delayed dummy data signal to output a comparison signal;

counting a duty clock of the comparison signal to output a duty clock count signal;

controlling a data signal according to the duty clock count signal;

outputting the data signal to a data line of the display panel; and outputting a gate signal to a gate line of the display panel.

17. The method of claim 16, wherein controlling the data signal according to the duty clock count signal comprises:

reading latch timing data from a look-up table using the duty clock count signal;

outputting a latch timing control signal for controlling a latch timing of the data signal using the latch timing data; and controlling the latch timing of the data signal using the latch timing control signal.

18. The method of claim 16, wherein controlling the data signal according to the duty clock count signal comprises:

reading compensation data of the data signal from a look-up table using the duty clock count signal; and compensating a data voltage of the data signal using the compensation data.

19. A display apparatus comprising:

a display panel configured to display an image, and comprising a gate line, a data line, and a dummy data line; and a display panel driving apparatus comprising:

a data driving part configured to generate a dummy data signal in response to dummy image data, output the dummy data signal to the dummy data line of the display panel, generate a data signal in response to image data, and output the data signal to the data line of the display panel, a comparing part configured to output a comparison signal in response to the dummy data signal and a delayed dummy data signal generated due to a load of the dummy data line, wherein the comparison signal indicates how much the delayed dummy data signal is delayed with respect to the dummy data signal, a data signal controlling part configured to control the data signal using the comparison signal, and a gate driving part configured to output a gate signal to the gate line of the display panel, wherein the comparing part comprises:

a diode configured to receive the dummy data signal and output a diode clipping signal using the dummy data signal; and a comparator configured to compare the diode clipping signal with the delayed dummy data signal and output the comparison signal.

* * * * *